(12) United States Patent
Salgado et al.

(10) Patent No.: US 7,991,994 B2
(45) Date of Patent: Aug. 2, 2011

(54) METHOD FOR SECURING AN AUTHENTICATION AND KEY AGREEMENT PROTOCOL

(75) Inventors: Stéphanie Salgado, Montrouge (FR); Jorge Sevilla Abellan, Meudon (FR)

(73) Assignee: Gemalto SA, Meudon (FR)

( * ) Notice: Subject to any disclaimer, the term of this patent is extended or adjusted under 35 U.S.C. 154(b) by 1083 days.

(21) Appl. No.: 11/571,119

(22) PCT Filed: Jun. 20, 2005

(86) PCT No.: PCT/IB2005/001746
§ 371 (c)(1),
(2), (4) Date: Dec. 21, 2006

(87) PCT Pub. No.: WO2006/000875
PCT Pub. Date: Jan. 5, 2006

(65) Prior Publication Data
US 2007/0250712 A1    Oct. 25, 2007

(30) Foreign Application Priority Data
Jun. 21, 2004   (EP) .................................... 04291562

(51) Int. Cl.
*H04L 29/06* (2006.01)
(52) U.S. Cl. ........................................ 713/155; 380/287
(58) Field of Classification Search .................. 713/155, 713/168; 380/278, 213, 228, 239; 705/51; 386/94; 369/47; 455/411; 726/2
See application file for complete search history.

(56) References Cited

U.S. PATENT DOCUMENTS

| 4,531,021 | A  | * | 7/1985  | Bluestein et al. ............. 380/239 |
| 5,117,458 | A  | * | 5/1992  | Takaragi et al. .............. 380/228 |
| 5,999,629 | A  | * | 12/1999 | Heer et al. ...................... 705/51 |
| 6,298,196 | B1 | * | 10/2001 | Shima et al. .................... 386/94 |
| 6,320,829 | B1 | * | 11/2001 | Matsumoto et al. ........ 369/47.12 |
| 6,519,701 | B1 | * | 2/2003  | Kawamura et al. .............. 726/2 |
| 6,570,990 | B1 | * | 5/2003  | Kohn et al. .................... 380/213 |
| 7,574,599 | B1 | * | 8/2009  | Zhang ........................... 713/168 |
| 2006/0079205 | A1 | * | 4/2006 | Semple et al. ................ 455/411 |
| 2006/0171541 | A1 | * | 8/2006 | Horn et al. .................... 380/278 |

OTHER PUBLICATIONS

Jakob E. Bardram; Context-Aware User Authentication—Supporting Proximity-Based Login in Pervasive Computing; Oct. 30, 2003; Springer Berlin / Heidelberg; vol. 2864/2003; 107-123.*

* cited by examiner

*Primary Examiner* — Saleh Najjar
*Assistant Examiner* — Monjour Rahim
(74) *Attorney, Agent, or Firm* — Pehr B. Jansson; The Jansson Firm

(57) ABSTRACT

An authentication method including operation of a personal token, a personal token for a terminal in a communication network, an authentication server, and a computer program for an authentication server. The secure server producing derived key material on the basis of a random and a secret key (K), said personal token including program instructions for re-computing the derived key material (Ck, Ik) on the basis of the received random and the secret key (K) as stored in the personal token. The personal token includes program instructions for using a re-computed part of the derived key material in order to interpret the received additional data.

16 Claims, 1 Drawing Sheet

METHOD FOR SECURING AN AUTHENTICATION AND KEY AGREEMENT PROTOCOL

BACKGROUND OF THE INVENTION

1. Field of the Invention

The invention relates to communication networks and in particular to authentication and key agreement protocols in such networks.

2. Description of the Related Art

Authentication and Key Agreement (AKA) protocols are widely used in wired and wireless environments to provide key material and proof of the identity between two connected entities. A typical example is a wireless subscriber accessing a Cellular Network who is authenticated towards an authentication server in the network.

Different entities or devices are involved in an AKA procedure.

A terminal HT which hosts a personal token (e.g. a mobile phone) and an authentication server (AS) communicate together. The personal token and a secure server store a same secret key K, also known as the master key.

In the usual AKA protocol (e.g. for implementing a secure data transfer), both the authentication server and the hosting terminal HT are able to use keys which are derived from a master key i.e. an integrity key Ik and a ciphering key Ck. Such keys Ik and Ck are derived from a master key which is shared by a secure server on one hand and the personal token on the other hand.

In other circumstances, i.e. a special AKA procedure, both the hosting terminal may be deprived from use of the Integrity key Ik and the ciphering key Ck, i.e. these derived keys be considered as sensitive data which must not be disclosed to the hosting terminal.

The procedure for performing a usual AKA procedure will now be described in reference to FIG. 1.

Typically, a secure server SS chooses a randomized array RAND. Using RAND with an algorithm called AKAAlg and the secret key K which is shared only by the secure server SS and the personal token, the secure server SS produces an authentication vector (AV).

The authentication vector AV is composed at least of the following components: the initial RAND, a result value (RES), some derived key material (DKM) i.e. typically the derived keys Ik and Ck, and a message authentication code (MAC). The authentication vector AV is then delivered to the authentication sever AS.

The authentication server AS sends the values RAND, MAC values and possibly other data to the hosting terminal HT. The hosting terminal then sends them to the personal token SE.

The personal token SE runs AKAAlg algorithm using the stored secret key K and the received parameters (at least RAND, MAC).

The personal token SE re-computes a MACT on the basis of the shared secret key K, and on the basis of the received RAND.

The personal token SE then compares the re-computed MACT value with the received MAC value (is MAC=MACT ?) in order to perform some integrity check and possibly an authentication procedure of the authentication server.

Then the personal token SE computes RES.

The hosting terminal sends RES to the authentication server so that the personal token becomes authenticated by the server. At the end, the authentication server AS authenticates the personal token by comparing the RES received from the hosting terminal with the XRED value received from the secure server SS.

The personal token SE also computes the derived keys Ik and Ck and sends them together with RES to the hosting terminal. The hosting terminal uses the derived keys to perform any further security operation towards the AS.

An example of this basic authentication AKA procedure is UMTS AKA as defined in 3GPP TS 33.102.

The explained AKA usual procedure is well adapted for providing secure authentication and sharing of key material between both the hosting terminal HT and the authentication server AS. However, in some specific circumstances, it is needed that the algorithm AKAAlg be processed in a different way within the personal token. For instance, under some specific circumstances, it is required that the derived keys Ik and Ck or part of them be regarded as sensitive data and therefore be prevented from being disclosed to the hosting terminal, i.e. that the derived keys Ik and Ck be kept inside the personal token instead of being delivered to the hosting terminal.

In these specific cases, a basic requirement for lots of situations is that the hosting terminal could not retrieve the derived keys using the standard AKA or any other procedure.

The aim of the invention is to provide a solution for avoiding the disclosure of the derived keys to the hosting terminal.

More generally some specific authentication procedure exist which are based on the usual AKA procedure but which differ in some aspects which may be of any kind. A same personal token may be subject to different reactions according to different possible AKA procedures encountered during its lifetime.

A second aim of the invention is to propose a way to efficiently signalize that a particular authentication procedure is required to the personal token.

BRIEF DESCRIPTION OF THE DRAWINGS

Other purposes, features and advantages of the invention will appear on reading the description which follows of a preferred implementation of the invention and of an embodiment of a system designed for this implementation, given as a non-limiting example, and referring to the attached drawings in which.

DETAILED DESCRIPTION OF THE INVENTION

Figure 1:
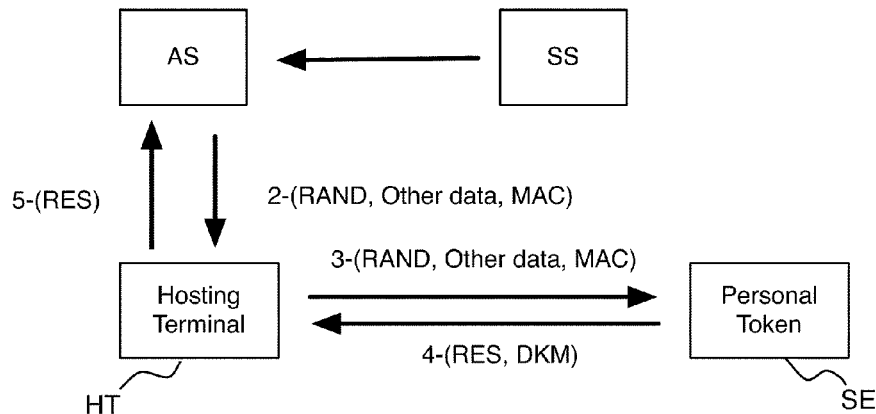
FIG. 1 is a schematic view of different steps of a known AKA procedure.
Figure 2:
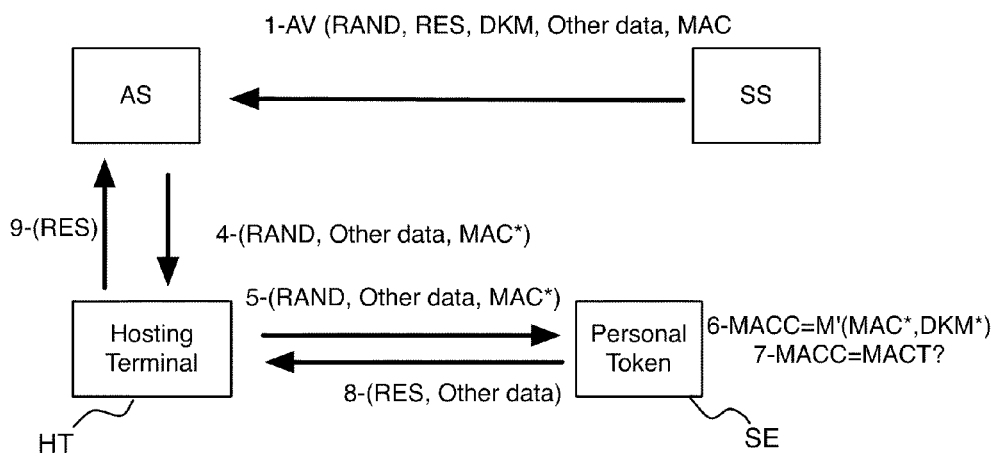
FIG. 2 is a schematic view of different steps of a procedure according to the present invention based on AKA.

The system according to the present invention as seen from FIG. 2 comprises different entities or devices, the same as those involved in an AKA procedure.

The system comprises a terminal HT which hosts a personal token SE. In a particular embodiment, the hosting terminal HT can be a mobile phone or more generally a personal token accepting device; the personal token accepting device may have the form of a housing provided with an aperture or slot to receive the personal token but also any form allowing the personal token to communicate with the personal token accepting device;

The system comprises an authentication server AS and a secure server SS with which the authentication server communicates and in which secure server a secret key or master key K is kept;

The personal token or secure element SE is hosted in the terminal HT. The hosting terminal HT communicates with the token.

The secret key K is kept also in the token but not disclosed to the hosting terminal HT. As well-known, the secret key K is a shared secret between the personal token and the secure server.

In a particular embodiment, the personal token (SE) is a card with integrated circuit also called smart card.

The present invention consists in securing an authentication and key agreement (AKA) procedure, i.e. a procedure allowing to establish key material and to provide proof of the identity between two connected entities.

The present embodiment allows to avoid the disclosure of derived keys such as the integrity key Ik or the ciphering key Ck to the hosting terminal HT, i.e. to avoid disclosure of derived key material or part of it to the hosting terminal HT.

The procedure according to the present embodiment comprises the following steps:

The hosting terminal HT sends an HTTP request towards the authentication server, requesting an AKA procedure. The AKA procedure may also be requested by the authentication server.

The AS is provided with a standard authentication vector (AV) from the Secure server (SS) (step 1 on FIG. 2).

The authentication vector (AV) is composed of at least the following components: the initial RAND, a result value RES, and derived key material referenced DKM in the following, i.e. derived keys Ik and Ck, and a message authentication code (MAC).

In an advantageous embodiment, the authentication server AS determines whether modification of the MAC is necessary or not in accordance with the nature of the encountered personal token (also called authentication token), and in particular based on user security settings (USSs) associated with the encountered personal token. Such settings may be prestored on the side of the authentication server, or may be received from the personal token through the terminal HT.

For some types of personal tokens for which Ik and Ck are not considered as sensitive data, the usual AKA procedure is to be applied, i.e. the un-modified MAC be transmitted to the token with the RAND value, and the derived keys will then be transmitted by the personal token to the hosting terminal HT.

Should the derived keys be however hidden according to the user security settings, the authentication server AS takes MAC value from the authentication vector AV and computes a modification of said MAC by using one of the derived keys. The Mac is thus modified by using at least part of the derived key material DKM.

As an example of such modification of the MAC using derived key material, this modification may be MAC*=M (MAC, DKM*) where DKM* is a modified part of derived key material DKM, for example a modified value Ik* based on value of the integrity key Ik.

Both the integrity key Ik and the Ciphering Key Ck are derived from the master key K and the RAND by a computation performed by the secure server.

As will be explained later, said secret master key K is also stored in the personal token SE and such derivation is also possible in the personal token as far as the token has received the RAND. Master key K therefore constitutes a shared secret between the personal token and the secure server.

Based on one of the derived keys Ik and Ck received from the secure server SS, the authentication server AS computes a modification of at least part of the derived key material, i.e. computes the DKM* parameter expressed here-above. For instance, the authentication server AS takes the first 64 bits of the well-known function (sha-1) applied to the integrity key Ik:

$$Ik^*=Trunc(SHA\text{-}1(IK))$$

Trunc denotes the truncation on the bit output of (SHA-1) and (SHA-1) is a well-known hash function applied to the integrity key Ik.

MAC* can be computed in the following fashion (step 3 on FIG. 2):

$$MAC^*=MAC\, XOR\, Trunc(SHA\text{-}1(IK))$$

The modification of the MAC is preferably reversible depending on knowledge of said modified part of the derived key material DKM*, in the formula MAC*=MAC XOR DKM*;

Once the modified value MAC* is computed by the authentication server AS, the authentication server AS sends RAND together with MAC* and together with values such as SQN, AK, AMF to the hosting terminal HT (step 4 on FIG. 2). A same message is for instance used for sending those different data.

The value RES remains stored in the authentication server.

The hosting terminal HT then sends RAND, MAC*, SQN, AK, AMF (and possibly other values) to the personal token SE (step 5 on FIG. 2).

An additional algorithm AKAAlg is performed in the personal token SE in the following way:

The personal token SE computes the derived keys Ck, Ik and the value RES which calculations are possible in the personal token because the personal token stores the master key K and has just received the RAND which are both necessary for computing Ck and Ik and for computing RES.

At this moment, Ck and Ik are present in the authentication server AS and in the personal token SE, but not in the hosting terminal HT. Until then such keys Ck and Ik can therefore be considered as sensitive data because they are not disclosed them to the hosting terminal HT.

In the present example, the personal token then performs computation of the non-modified MAC on the basis of the received MAC* and on the basis of the re-computed Ik.

To this end, the personal token SE computes the modified integrity key Ik*, i.e. the modified part DKM* of the derived key material DKM.

$$Ik^*=Trunc(sha\text{-}1(Ik))$$

Then the personal token computes the MAC value corresponding to the received modified value MAC*:

MACC=M'(MAC*, Ik*), i.e. MACC=M'(MAC*, DKM*) where M' is the inverse function of M used by AS i.e. MACC=MAC* XOR Ik* in the present case (step 6 on FIG. 2). The reversible function M' is known beforehand by both the personal token SE and the authentication server AS.

The M' computation is, in the detailed example given above, the following computation: MACC=MAC* XOR Trunc(SHA-1 (IK))

The token also computes MACT, i.e. the MAC value calculated on the basis of both the RAND and the master key K. Typically the MAC will depend also on the transmitted parameters SQN and AMF.

MACT is then compared with MACC (step 7 on FIG. 2).

As described above, M is preferably a reversible function while the derived key used in computation of the modified MAC is known on both sides.

In another embodiment of the present invention, M may not be reversible. In such a case the personal token re-computes the MAC value, then re-computes the modification of the MAC value and then compares the received modified MAC value with the re-computed and re-modified MAC value.

A way to compare MACC with MACT is to compare a concatenation of MACT with other values, for example compare (SQN xor AK∥AMF∥MACT) with a concatenation of MACT with other values, for example (SQN xor AK∥AMF∥MACC), in which formulas ∥ is the concatenation symbol.

In case the MAC comparison is unsuccessful, i.e. MACT appears to be different from MACC, the personal token informs the hosting terminal HT that the MAC comparison is unsuccessful.

In case the MAC comparison is successful, the personal token SE computes and sends RES to the hosting terminal (step 8 on FIG. 2) and keeps the other data (DKM, i.e. Ik and Ck in the present example) or a part of it hidden in the token. The hosting terminal then sends RES to the authentication server AS (step 9 on FIG. 2) for authentication of the personal token SE by the authentication server AS.

In the present example, both the personal token SE and the authentication server AS shall use a concatenation of Ik and Ck named Ks to derive internal and external NAF-specific keys Ks_ext_NAF and Ks_int_NAF.

The internal NAF-specific key Ks_int_NAF is used for establishing a secure channel between the personal token and a remote server through the terminal HT but hidden from the terminal HT.

The external NAF-specific key Ks_ext_NAF is used for establishing a secure channel between the hosting terminal HT and a remote server.

In the case the MAC is not modified by the authentication server AS before being sent to the personal token SE through the terminal, the personal token SE behaves according to the usual procedure, i.e. re-computes and checks the value of the MAC and after authentication provides the derived keys Ik and Ck to the terminal.

Such modification of the MAC or any other data associated with the RAND in the authentication procedure by use of derived key material or part of it provides many advantages by itself, independently of the possibility of triggering one special procedure among two provided ones.

That is why the modification of the MAC may be systematically applied without possibility for different procedures depending on modification or not of the MAC.

Modification of the MAC has the advantage of hiding the true value of the MAC, thereby preventing any interpreting of the MAC with the associated RAND by a fraudulent entity which may then deduce some value of sensitive data.

Although hidden by such modification, the MAC nevertheless remains able to be interpreted by the personal token, i.e. the token can still check the validity of the MAC because the personal token embeds derived key material which is necessary for checking such validity.

Modification of the MAC has also the advantage of preventing that a fraudulent entity may pick up a transmitted (RAND, MAC) couple and may replay it to the token, so as to gain the value of Ck and Ik in return.

All these advantages are also true for other data transmitted with the RAND.

Independently from the hiding advantages explained above, possibility of opting or not as to modification of the MAC or of another data transmitted with the RAND in the authentication procedure has the advantage of efficiently signalizing a special procedure to be performed by the card in response to such modification.

In the present case, such modification of the MAC signalizes a necessity to keep the sensitive data Ik and Ck inside the card. Same signalizing may be applied for indicating a particular procedure to be carried out in the token, whatever the procedure which may be different from hiding derived key material. A modified MAC may be interpreted by the token as triggering a special behaviour to be performed by the token in response to said signalizing.

Also in the case of hiding derived key material, the signalizing through modification may consist in inducing the token to consult a flag such as the AMF parameter which is sent to the token together with the RAND. A special value of the AMF may then be read by the token as a particular meaning, for example commanding the hiding of Ck and Ik by the token or any other procedure. In absence of such modified MAC and therefore any redirection to the AMF flag, the same card will be allowed to disclose the Ck and Ik values.

In such an example, many combinations exist between the meaning of the MAC being modified or not and the particular value of the AMF flag on which fla the token is redirected by the MAC being modified.

Same procedures as described above may be applied by using a modification of any value which is transmitted with the RAND. Such another value as the MAC may be a value which is used in the computation of the MAC. However, such value is preferably not used in the computation of any derived key material.

Such other data that may be modified can be the SQN as an example. SQN may be modified in the following way, i.e.:

The authentication server modifies SQN, for example as follows: SQN*=SQN XOR DKM* and then transmits RAND, SQN * and the unmodified MAC (computed by the SS from the unmodified SON value and Rand). Then the token performs the following operations.

First the token checks that the received SQN (either the unmodified SON or the modified SQN*) is in a correct range according to SQN management rules.

Second the token manages two possible cases. In the first case, the token supposes that SQN was not modified.

Then the token checks that SQN is in the correct range. In the case SQN is in the correct range, then the token computes MACT as a function of the RAND, the master key and typically the SON and the AMF and compares MACT with the received MAC. The MAC value is preferably computed with the unmodified data, i.e. the unmodified RAND, SQN, and AMF.

If MAC=MACT then the token identifies that the usual AKA is taking place, and thus CK and DK are disclosed.

Otherwise, the token manages the second case.

The token supposes that SQN was modified, and thus that SQN* was the received value.

Then the token computes DKM, computes DKM*, compute SQN=SQN*XOR DKM*, computes MACT as a function of the master key, the RAND, and typically the SQN and the AMF flag and then compares MACT with the received MAC.

If MACT is different from MAC then the authentication is rejected.

Otherwise the token verifies that SON is in the correct range and then does not disclose CK and IK.

SQN or SQN* may be sent concealed by AK (thus SQN xor AK or SQN xor DKM* xor AK is sent).

AMF can be modified at the same time as SQN, for instance performing SQN_AMF*=(SQN∥AMF) xor DKM*.

SQN, AMF and MAC can be also modified at the same time AUTH*=(SQN∥AMF∥MAC) xor DKM*.

However, RAND should not be modified as it is used to compute DKM.

Same signalizing may be applied for indicating to the hosting terminal through the card that a specific usage needs to be enforced as to some sensitive data, typically as to the derived key material. In this case, even though the derived key material exits the SE, the hosting terminal may perform the described MAC procedures by itself after the AKAAIg has taken place in the personal token.

The invention claimed is:

1. An authentication method in a network including a secure server, an authentication server, and at least a terminal (HT) which hosts an personal token (SE) said authentication method comprising;
    a. in the secure server, performing a calculation on the basis of a random (RAND) and a secret key thereby producing derived key material (Ck, Ik);
    b. sending said derived key material (Ck, Ik) together with said random and together with additional data (AUTN, XRES, MAC, SQN, Ak, AMF) from the secure server (SS) to the authentication server (AS);
    c. in said authentication server, modifying at least part of said additional data (MAC*, SQN*) by means of at least part of said derived key material (Ck, Ik);
    d. sending said additional data (AUTN, AUTN*, XRES, MAC, SQN, Ak, AMF, Mac*, SQN*) and said random (RAND) through the hosting terminal to said personal token;
    e. in the personal token, performing a calculation based on the received random (RAND) for re-computing said at least part of said derived key material (Ck, Ik) as used in the authentication server for modifying said part of the additional data; f. in the token, using said re-computed at least part of the derived key material for interpreting the modified part of the received additional data.

2. The method according to claim 1, wherein the modified part of the received additional data includes identifying whether said part of the received additional data has been modified prior to sending such additional data to the personal token or not.

3. The method according to claim 1, wherein the modified part of the received additional data includes checking validity of an expected value for the received additional data.

4. The method according to claim 1, wherein the recomputed part of the derived key material is maintained in the personal token.

5. The method according to claim 1, wherein the method includes the token performing a re-computing of said part of the additional data on the basis of said received random and performing a re-modification of said part of the additional data on the basis of said derived key material, and comparison of the re-computing and re-modified additional data part with the received modified part of the additional data.

6. The method according to claim 1, wherein the token performing an inverse modification of the received modified part of the additional data so as to retrieve the non modified part of the additional data as initially produced by the secure server, re-computing in the token said part of the additional data on the basis of said received random and on the basis of the secret key, and performing a comparison of the non-modified part of the additional data as initially produced by the secure server with the re-computed part of the additional data.

7. The method according claim 1, wherein the modified part of the additional data is the MAC (message authentication Code) as usually used for authenticating a server to the token.

8. The method according to claim 7, wherein the token performs a re-computing of the MAC.

9. The method according to claim 8, the personal token performs a modification of the re-computed MAC based on the derived key material and compares said modified re-computed MAC with the modified MAC received from the authentication server through the hosting terminal.

10. The method according to claim 7, wherein the token uses the derived key material to perform a reverse modification of the received modified MAC and compares the re-computed MAC with the reversely modified received MAC.

11. The method according to claim 1, wherein the derived key material includes at least a part of the ciphering key (Ck).

12. The method according to claim 1, wherein at least part of the derived key material includes the Integrity key (Ik).

13. The method according to claim 1, wherein it includes the following alternative steps: g1) if the said part of the additional data has been modified with said at least part of the derived key material, maintaining in the token at least a portion of the derived key material; g2) if the said part of the additional data is non modified, transmitting from the token to the terminal said portion of the derived key material.

14. The method according to claim 13, wherein the method includes the personal token performing a re-computation of said part of the additional data on the basis of said received random and the personal token maintaining said portion of the derived key material inside the token in case the said received part of the additional data corresponds neither to the recomputed part of the additional data, neither to the said recomputed part of the additional data as re-modified with derived key material.

15. The method according to claim 1, wherein the personal token sends through the terminal a response (RES) to the authentication server and the authentication server authenticates the personal token by means of said response, and in that once the authentication server and the personal token are mutually authentified, the personal token derives an internal key (KsNAFint) and an external key (KsNAFext) from the derived key material (Ck, Ik), said internal key (KsNAFint) being used for establishing a secure channel between the personal token and a remote server through the terminal but hidden to the terminal, and said external key (KsNAFext) being used for establishing a secure channel between the terminal and a remote server.

16. An authentication method in a network including a secure server, an authentication server, and at least a terminal which hosts a personal token said authentication method comprising the following steps:
    a. in the secure server, performing a calculation on the basis of a random (RAND) and a secret key for producing derived key material (Ck, Ik);
    b. sending said derived key material (Ck, Ik) together with said random and together with additional data (AUTN, XRES, MAC, SQN, Ak, AMF) from the secure server (SS) to the authentication server (AS);
    b'. in said authentication server, using a data basis of the personal tokens in the network for determining whether the token to be authenticated is a first type personal token or a second type personal token in the case the token is a first type personal token:
    c1. modifying at least part of said additional data (MAC*, SQN*) by means of at least part of said derived key material (Ck, Ik),
    d1. sending said additional data (AUTN, AUTN*, XRES, MAC, SQN, Ak, AMF, Mac*, SQN*) and said random (RAND) through the hosting terminal to said personal token.

e1. in the personal token, re-computing said at least part of said derived key material (Ck, Ik) on the basis of the received RAND and the secret key K;
f1. in the token, using said re-computed at least part of the derived key material for interpreting the modified part of the received additional data; and
g1. maintaining in the token said re-computed part of the derived key material; in the case the token is a second type personal token:
c2. sending said additional data (AUTN, AUTN*, XRES, MAC, SQN, Ak, AMF, Mac*, SQN*) and said random (RAND) through the hosting terminal to said personal token without performing said modification based on said part of the derived key material.
d2. in the personal token, re-computing said at least part of said derived key material (Ck, Ik) on the basis of the received RAND and the secret key K and transmitting from the personal token to the terminal said at least part of the derived key material.

* * * * *